United States Patent
Sun et al.

(10) Patent No.: US 8,149,713 B2
(45) Date of Patent: Apr. 3, 2012

(54) FORWARDING OF PACKETS BASED ON A FILTERED FORWARDING INFORMATION BASE

(75) Inventors: Fan Sun, Fremont, CA (US); David Delano Ward, Somerset, WI (US); Shyamsundar Nandkishor Maniyar, San Jose, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 332 days.

(21) Appl. No.: 12/569,712

(22) Filed: Sep. 29, 2009

(65) Prior Publication Data

US 2011/0075680 A1 Mar. 31, 2011

(51) Int. Cl.
*G01R 31/08* (2006.01)

(52) U.S. Cl. .......................... 370/237; 370/400; 370/401

(58) Field of Classification Search .................... None
See application file for complete search history.

(56) References Cited

U.S. PATENT DOCUMENTS

| | | | |
|---|---|---|---|
| 7,035,256 B1 * | 4/2006 | Neufeld et al. | 370/389 |
| 7,209,449 B2 * | 4/2007 | Tang et al. | 370/238 |
| 7,499,447 B2 * | 3/2009 | Shenoy et al. | 370/389 |
| 7,620,039 B2 * | 11/2009 | Marce et al. | 370/380 |
| 2003/0126289 A1 | 7/2003 | Aggarwal et al. | |
| 2005/0074003 A1 * | 4/2005 | Ball et al. | 370/389 |
| 2006/0253606 A1 | 11/2006 | Okuno | |
| 2007/0097973 A1 | 5/2007 | Scudder et al. | |
| 2007/0153699 A1 | 7/2007 | Fernando et al. | |

* cited by examiner

*Primary Examiner* — Robert Wilson
(74) *Attorney, Agent, or Firm* — The Law Office of Kirk D. Williams

(57) ABSTRACT

A filtered Forwarding Information Base (FIB) (the "complete local FIB") is used to determine how to forward packets, typically on line cards. The complete local FIB is generated by filtering (i.e., dropping or removing) extraneous entries in the standard global FIB of a router. This smaller FIB is then installed within the memory of a forwarding engine, possibly implemented as a single application-specific integrated circuit (ASIC), for use in determining how to forward packets, with the router forwarding packets accordingly.

22 Claims, 3 Drawing Sheets

US 8,149,713 B2

FORWARDING OF PACKETS BASED ON A FILTERED FORWARDING INFORMATION BASE

TECHNICAL FIELD

The present disclosure relates generally to communications systems.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Routers are communications devices used in a network to "route" packets through the network. Typically, routers exchange information, using routing protocols, to discover the topology of the network and to determine paths for routing packets through the network. The exchanged information is typically stored in a Routing Information Base (RIB). A router then processes information in the RIB to determine how to forward packets from the router, with this information stored in a Forwarding Information Base (FIB). The FIB typically contains, for each route (e.g., prefix): identification of from which interface to forward a corresponding packet, as well as next hop information, and possibly a label to use when label switched routing is performed. In the core of the network, it is possible for the FIB to contain hundreds of thousands of entries (e.g., one for each route in the FIB). When a router uses a distributed architecture, the same FIB is typically stored on each line card; although in the case of virtual private networks, the FIB stored on different line cards may be different.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1:
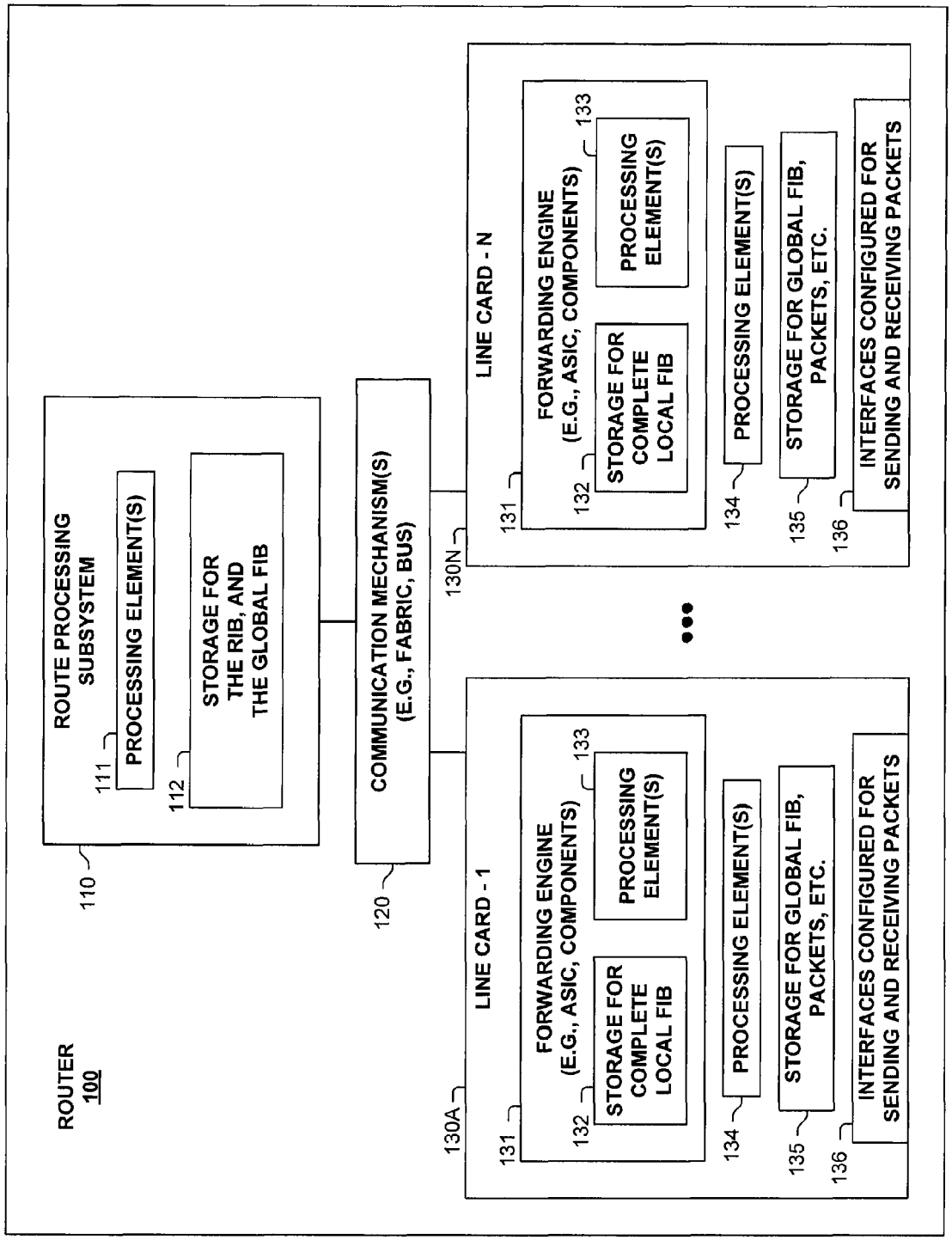
FIG. 1 illustrates a block diagram of a communications device (e.g., router) operating according to one embodiment.

Disclosed are, inter alia, methods, apparatus, computer-storage media, mechanisms, and means associated with the forwarding of packets based on a filtered Forwarding Information Base (FIB). In one embodiment, a router performs a method comprising: communicating, via one or more routing protocols, with other routers to generate a routing information base (RIB) for identifying topology information of, including routes within, a network attached to the router; generating, from the RIB, a global forwarding information base (FIB) identifying forwarding information for a plurality of routes, with said forwarding information including an identification of an egress interface of the router from which to forward a corresponding packet and next hop information; filtering the global FIB to generate a complete local FIB identifying forwarding information for a plurality of packets received by the router, such that the complete local FIB includes a copy of less than all of the entries in the global FIB, with the complete local FIB corresponding to a plurality of routes but not all of the routes in the plurality of routes; determining how to forward each of the plurality of packets based on the complete local FIB; and forwarding each of the plurality of packets based on the complete local FIB.

One embodiment includes a router, comprising: a route processing subsystem, including a router processor and memory, configured for communicating, via one or more routing protocols, with other routers to generate a routing information base (RIB) for identifying topology information of, including routes within, a network attached to the router; and configured for generating, from the RIB, a global forwarding information base (FIB) identifying forwarding information for a plurality of routes, with said forwarding information including an identification of an egress interface of the router from which to forward a corresponding packet and next hop information; a plurality of line cards communicatively coupled to the route processing subsystem, with each of the plurality of line cards including: a plurality of interfaces for communicating packets with other communications devices; storage configured for storing a global forwarding information base (FIB) including forwarding information for how to forward corresponding packets from the router, with said forwarding information including an identification of next hop information and an egress interface of the router from which to forward a corresponding packet; a forwarding engine configured for storing a complete local FIB, and configured for determining how to forward packets based on the complete local FIB; and one or more processors configured for filtering the global FIB stored locally on the line card to generate the complete local FIB identifying forwarding information for packets, such that the complete local FIB includes a copy of less than all of the entries in the global FIB.

One embodiment includes a router, comprising: a plurality of line cards, with each of the plurality of line cards including: a plurality of interfaces configured for sending and receiving packets; storage configured for storing a global forwarding information base (FIB) including forwarding information for how to forward corresponding packets from the router, with said forwarding information including an identification of next hop information and an egress interface of the router from which to forward a corresponding packet; a forwarding engine configured for storing a complete local FIB, and configured for determining how to forward packets based on the complete local FIB; and means for filtering the global FIB stored locally on the line card to generate the complete local FIB identifying forwarding information for packets, such that the complete local FIB includes a copy of less than all of the entries in the global FIB; and one or more communications mechanism configured for communicating packets or information among the plurality of line cards.

2. Description

Disclosed are, inter alia, methods, apparatus, computer-storage media, mechanisms, and means associated with the forwarding of packets based on a filtered Forwarding Information Base (FIB). Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although any embodiment may include some, all or none of the features, elements and/or limitations described in relation to a particular different one embodiment. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Note, nothing described or referenced in this document is admitted as prior art to this application unless explicitly so stated.

In one embodiment, a method is performed by a router, with said method comprising: communicating, by the router via one or more routing protocols, with other routers to generate a routing information base (RIB) for identifying topology information of, including routes within, a network attached to the router; generating, from the RIB, a global forwarding information base (FIB) identifying forwarding information for a plurality of routes, with said forwarding information including an identification of an egress interface of the router from which to forward a corresponding packet and next hop information; filtering the global FIB to generate a complete local FIB identifying forwarding information for a plurality of packets received by the router, such that the complete local FIB includes a copy of less than all of the entries in the global FIB such that the complete local FIB does not include all routes in the plurality of routes; determining how to forward each of the plurality of packets based on the complete local FIB; and forwarding each of the plurality of packets based on the complete local FIB.

In one embodiment, the router comprises: a line card; wherein the line card includes: a plurality of interfaces configured for sending and receiving packets; the global FIB; and a forwarding engine for performing said operation of determining how to forward each of the plurality of packets based on the complete local FIB; and wherein the forwarding engine includes the complete local FIB. In one embodiment, the line card comprises an application-specific integrated circuit which includes the forwarding engine, which said includes the complete local FIB.

In one embodiment, the router comprises: a route processing subsystem and a line card; wherein said operations of communicating with other routers and generating the global FIB are performed by the route processing subsystem; wherein the method includes storing a copy of the global FIB onto the line card; wherein the line card includes: the global FIB said copied to it and a forwarding engine for performing said operation of determining how to forward each of the plurality of packets based on the complete local FIB stored on the line card; wherein the forwarding engine includes the complete local FIB; and wherein said operation of filtering of the global FIB to generate the complete local FIB is performed on the line card. In one embodiment, the line card includes an application-specific integrated circuit which includes the forwarding engine, which said includes the complete local FIB.

In one embodiment, said operation of filtering is responsive to a configured predetermined role of the line card of the router. In one embodiment, said one or more routing protocols include an interior gateway protocol (IGP). In one embodiment, the global FIB includes marking information for identifying what portion of said forwarding information in the global FIB should and what should not be installed in the complete local FIB by said operation of filtering the global FIB; and wherein said marking information identifies that all forwarding information corresponding to routing information received from at least one specific routing protocol of said one or more routing protocols should be installed in the complete local FIB by said operation of filtering the global FIB.

In one embodiment, the global FIB includes marking information for identifying what portion of said forwarding information in the global FIB should and what should not be installed in the complete local FIB by said operation of filtering the global FIB. One embodiment includes marking routes in the RIB such that said operation of generating the global FIB causes said marking information to be included in the complete local FIB.

In one embodiment, the global FIB includes forwarding information including labels for a plurality of label-switched routes of the plurality of routes; and wherein said operation of filtering the global FIB filters out one or more of the plurality of label-switched routes that will not be used in forwarding packets by the line card based on said topology information. In one embodiment, said operation of filtering the global FIB filters out one or more of the plurality of routes that will not be used in forwarding packets by the line card based on said topology information. In one embodiment, said operation of filtering the global FIB in generating the complete local FIB in determining whether or not to include an entry in the local FIB is responsive to configuration settings received via a user interface. In one embodiment, said operation of filtering the global FIB in generating the complete local FIB in determining whether or not to include an entry in the local FIB is responsive to administrative tags, prefix ranges, or masklengths of entries in the global FIB. In one embodiment, the global FIB includes over a hundred different forwarding information entries; and wherein said operation of filtering the global FIB results in only forwarding information for a single default route being stored in the complete local FIB. In one embodiment, the global FIB includes over one hundred thousand different forwarding information entries; and wherein said operation of filtering the global FIB results in less than ten thousand different forwarding entries being stored in the complete local FIB.

One embodiment includes a router, comprising: a route processing subsystem, including a router processor and memory, configured for communicating, via one or more routing protocols, with other routers to generate a routing information base (RIB) for identifying topology information of, including routes within, a network attached to the router; and configured for generating, from the RIB, a global forwarding information base (FIB) identifying forwarding information for a plurality of routes, with said forwarding information including an identification of an egress interface of the router from which to forward a corresponding packet and next hop information; a plurality of line cards communicatively coupled to the route processing subsystem, with each of the plurality of line cards including: a plurality of interfaces for communicating packets with other communications devices; storage configured for storing a global forwarding information base (FIB) including forwarding information for how to forward corresponding packets from the router, with said forwarding information including an identification of next hop information and an egress interface of the router from which to forward a corresponding packet; a forwarding engine configured for storing a complete local FIB, and configured for determining how to forward packets based on the complete local FIB; and one or more processors configured for filtering the global FIB stored locally on the line card to generate the complete local FIB identifying forwarding information for packets, such that the complete local FIB includes a copy of less than all of the entries in the global FIB.

In one embodiment, each of the plurality of line cards comprises an application-specific integrated circuit which includes the forwarding engine, which said includes the complete local FIB. In one embodiment, the global FIB includes marking information for identifying what portion of said forwarding information in the global FIB should and what should not be installed in the complete local FIB by said one or more processors configured for filtering the global FIB stored locally on the line card to generate the complete local FIB.

One embodiment includes a router, comprising: a plurality of line cards, with each of the plurality of line cards including: a plurality of interfaces configured for sending and receiving packets; storage configured for storing a global forwarding information base (FIB) including forwarding information for how to forward corresponding packets from the router, with said forwarding information including an identification of next hop information and an egress interface of the router from which to forward a corresponding packet; a forwarding engine configured for storing a complete local FIB, and configured for determining how to forward packets based on the complete local FIB; and means for filtering the global FIB stored locally on the line card to generate the complete local FIB identifying forwarding information for packets, such that the complete local FIB includes a copy of less than all of the entries in the global FIB; and one or more communications mechanism configured for communicating packets or information among the plurality of line cards. In one embodiment, for each particular line card of the plurality of line cards said means for filtering the global FIB is responsive to a configured predetermined role of the particular line card. In one embodiment, a first line card of the plurality of line cards and a second line card of the plurality of line cards are each configured as having different predetermined roles, and wherein said means for filtering the global FIB of the first and second line cards are configured to generate different complete local FIBs based on said different predetermined roles.

In one embodiment, the router comprises: a route processing subsystem, including: storage configured for storing a routing information base (RIB) and the global forwarding information base (FIB); one or more processing elements; means for establishing the RIB based on exchanged routing information using one or more routing protocols with one or more other routers, with the RIB identifying routes and topology information of a network attached to the router; and means for generating, based on the routing information base (RIB), a global forwarding information base (FIB) for the router for identifying how to forward packets from the router; wherein the global FIB is copied from the route processing subsystem to each of the plurality of line cards; and wherein the said one or more communications mechanisms are configured for communicating packets or information among the plurality of line cards and the route processing subsystem. In one embodiment, said means for filtering the global FIB stored locally on the line card to generate the complete local FIB on each particular line card of the plurality of line cards is configured to filter routes according to its configured predetermined role.

Expressly turning to the figures, FIG. 1 illustrates a communications device, router 100, operating according to one embodiment. As shown, router 100 includes a route processing subsystem 110, n line cards 130A-N (where n is one or more), and one or more communications mechanism(s) 120 (e.g., switch fabric, bus, backplane, etc.) used to provide communication among route processing subsystem 110 and line cards 130A-N.

As shown, one embodiment of route processing subsystem 110 includes processing element(s) 111, storage 112 for the Routing Information Base (RIB) and for the global Forwarding Information Base (FIB). Typically, the route processing subsystem communicates, via one or more routing protocols, with other routers to generate the RIB for identifying topology information of, including routes within, a network attached to router 100. Based on the RIB, route processing subsystem generates the global FIB identifying forwarding information for a plurality of routes, with said forwarding information typically including an identification of an egress interface of router 100 from which to forward a corresponding packet and next hop information. Typically the FIB is distributed to each of line cards 130A-N. Note, in one embodiment, router 100 does not have separate line cards. Therefore, typically the interfaces and forwarding engine are located on a same board, and there is typically only the global FIB (and not copies thereof) stored in the router.

Note, the phrase "global FIB" is used to denote the FIB for router 100 (and in literature is typically simply referred to as "FIB") generated from the RIB, so as to be able to distinguish the "complete local FIB" resulting from the filtering of the "global FIB."

Further, as shown, each of line cards 130A-N include a forwarding engine 131 including storage 132 for the complete local FIB (generated by filtering the global FIB), and one or more processing element(s) 133 configured for determining how to forward a packet based on the complete local FIB in storage 132. In one embodiment, forwarding engine 131 is an application-specific integrated circuit including: storage 132 for the complete local FIB, and processing elements 133. In one embodiment, forwarding engine 131 is implemented using discrete components or in another manner. Note, forwarding engine 131 may include specialized circuitry or devices for performing lookup operations, such as, but not limited to those corresponding to a content-addressable memory.

Additionally, as shown, each of line cards 130A-N include processing element(s) 134, storage 135 for the global FIB, packets, etc., and interfaces 136 configured for sending and receiving packets, typically to other communications devices in an attached network. Note, in one embodiment, forwarding engine 131 determines how to forward a packet based on only a limited portion of the packet (e.g., typically a portion of the packet's header possibly plus implementation-specific information) while the remainder of the packet (or possibly even the entire packet) is stored in storage 135. This forwarding based on a packet header without providing the entire packet to a packet processing engine is a standard technique in routers, as there is typically no reason to use the resources to send the entire packet through a forwarding engine when all it needs is a small portion thereof in making its routing decision. After the forwarding decision is made, the packet is then retrieved from storage 135 and forwarded accordingly.

In one embodiment, storage 135 stores a complete copy of the global FIB stored in storage 112, with the global FIB in storage 135 being filtered, such as by processing element(s) 134, to create the complete local FIB used to determine how to forward packets by forwarding engine 131. In one embodiment, the global FIB stored in storage 112 is filtered to create the complete local FIB used to determine how to forward packets by forwarding engine 131. The complete local FIB in storage 132 includes a copy of less than all of the entries in the global FIB corresponding to a plurality of routes less than all routes for which forwarding information is stored in the global FIB. Forwarding engine 131 determines how to forward packets based on the complete local FIB stored in forwarding engine 131; and router 100 accordingly forwards the packets from one of line cards 130A-N. Note, the complete local FIB stored in line cards 130A-N are all the same, some are the same, or none are the same in one embodiment.

In one embodiment, the filtering of the global FIB is performed by each of line cards 130A-N. In one embodiment, the filtering of the global FIB is performed by route processing subsystem 111. Note, when used herein, the term "filtering" (as in the filtering of the global FIB to generate the local FIB) means to simply remove or drop entries from the global FIB to generate the complete local FIB (i.e., with fewer entries that the global FIB). This filtering operation does not include aggregation or compression of routes. Moreover, the complete local FIB is not a cache of the global FIB. As the name suggests, the complete local FIB includes the believed complete set of forwarding information required, and not a cache thereof. Thus, one embodiment filters the global FIB to remove those routes that will not be used in forwarding packets, therefore generating the complete local FIB having a smaller size, which is then typically completely stored in the forwarding engine 131. Thus, the term complete local FIB is used to represent a local FIB including the forwarding information for all the routes that are required for determining how to forward packets (or at least substantially all such routes). When forwarding engine 131 is implemented as a single ASIC, then the complete local FIB is stored therein, thus having no external memory (e.g., having a slower memory access time). In one embodiment, the filtering of the global FIB is responsive to marked routes therein, a configured predetermined role of the line card, network topology, and/or configuration received via a user interface, etc. For example, if the role of the line card is uplink to the global Internet, then a small number of routes (e.g., a single default route and/or all routes from a certain routing protocol) may be sufficient. In contrast, a line card in a customer facing role typically will require more routes (e.g., about the hosts of the customer(s)). In one embodiment, routes, when added to the RIB, are marked based on some configuration rules to identify whether to include (or not to include) the corresponding forwarding information in the complete local FIB. These markings are correspondingly added to the global FIB. For example, one embodiment might want to install in the complete local FIB: all routes from a particular routing protocol (e.g., IGP, OSPF, IS-IS), and therefore, these routes are marked accordingly.

Additionally, one embodiment filters out routes with labels that will not be used by a line card (e.g., based on network topology). One embodiment filters out all routes except a single default route filtered from more than a hundred entries (and possibly from order(s) of magnitude greater number of entries). The global FIB of a core router may include on the order of five hundred thousand entries or more, with one embodiment filtering these entries to generate a complete local FIB with on the order of five or ten thousand entries. One embodiment filters entries differently on different line cards (e.g., based on topology of the network); entries based on administrative tags, prefix ranges, masklengths of entries in the global FIB, etc.

The memory on a line card control plane is relatively cheap and usually large enough to hold all the routes learned by the router in the global FIB. One embodiment selectively filters the routes from the global FIB based on a set of criteria to the complete local FIB such that it fits into a small routing table, such as can be stored in a forwarding engine built on a single ASIC. Also, by maintaining a copy of the global FIB on a line card 130A-N, in response to a configuration, policy or network function changes, the forwarding information in the global FIB can be quickly filtered on the line card 130A-N (without intervention required by route processing subsystem 110) and programmed into storage 132 for the complete local FIB in forwarding engine 131 (e.g., into the memory of the ASIC).

Figure 2:
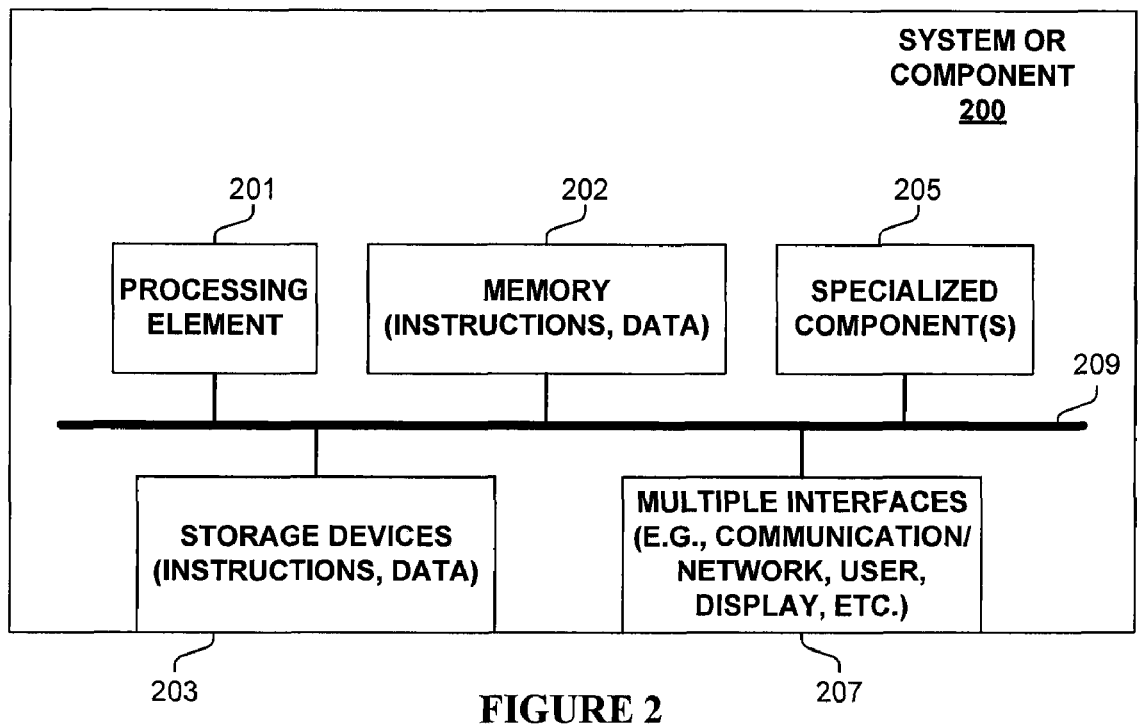
FIG. 2 illustrates an example system or component used in one embodiment.

FIG. 2 is block diagram of a system or component 200 (including a partial design implemented in an ASIC) used in one embodiment associated with the forwarding of packets based on a filtered Forwarding Information Base (FIB). In one embodiment, system or component 200 performs one or more processes or operations thereof, corresponding to one of the flow, block or other diagrams illustrated or otherwise described herein.

In one embodiment, system or component 200 includes a processing element 201, memory 202, storage devices 203, specialized components 205 (e.g. optimized hardware such as for performing lookup operations for identifying matching entries in a FIB or filtering a global FIB, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application.

Various embodiments of component 200 may include more or less elements. The operation of component 200 is typically controlled by processing element 201 using memory 202 and storage devices 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with an embodiment. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with an embodiment.

Figure 3:
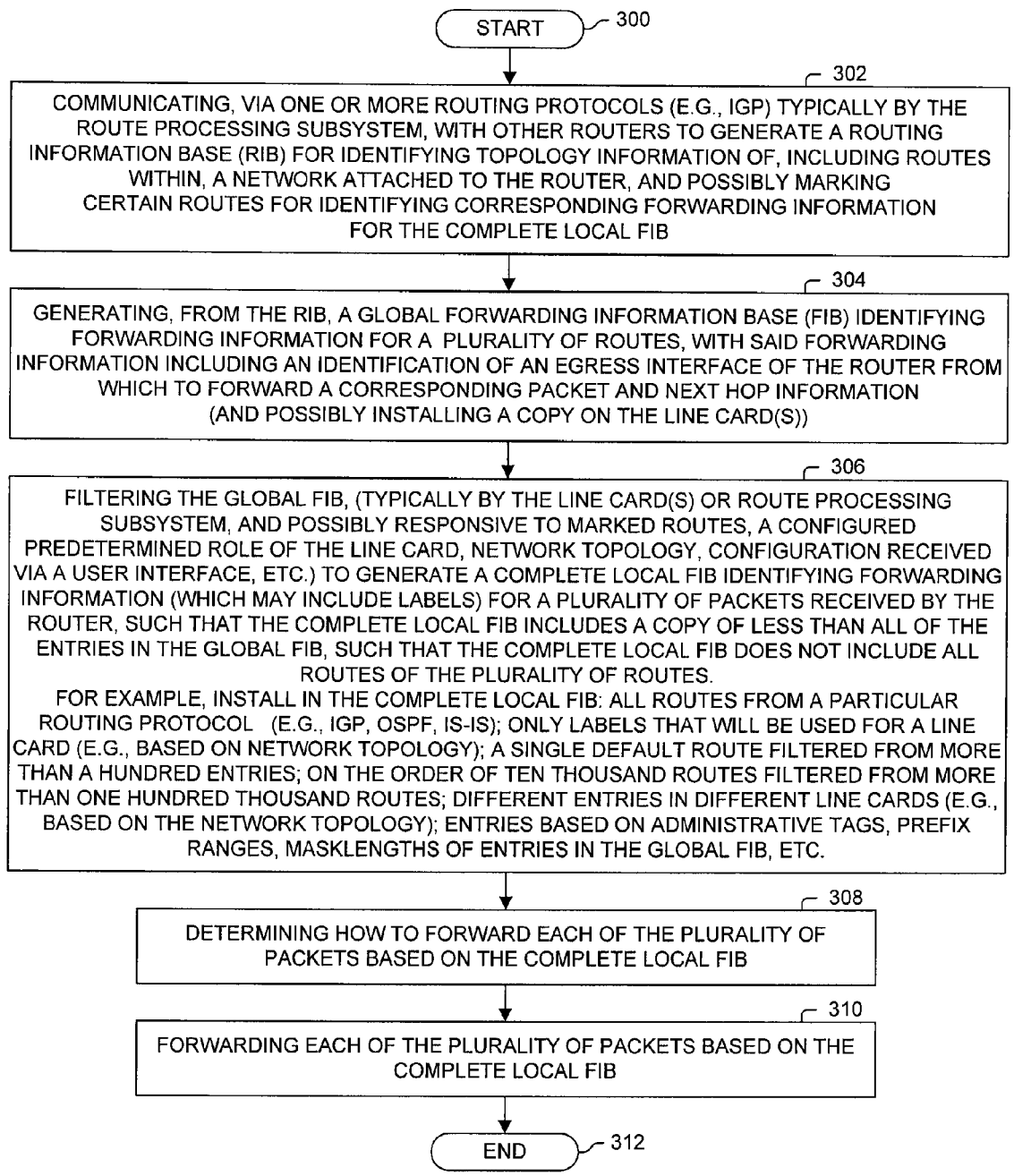
FIG. 3 illustrates a process performed in one embodiment.

FIG. 3 illustrates a process performed in one embodiment. Processing of this flow diagram begins with process block 300. In process block 302, the router, typically by the route processing subsystem, communicates via one or more routing protocols with other routers to generate a routing information base (RIB) for identifying topology information of, including routes within, a network attached to the router. Some of these routes are and possibly marked for identifying corresponding forwarding information to be included in (e.g., or excluded from) the complete local FIB. An example of a routing protocol is an Interior Gateway Protocol (IGP) such as, but not limited to, Open Shortest Path First (OSPF) or Intermediate System to Intermediate System (IS-IS). Next, in process block 304, generated from the RIB is a global forwarding information base (FIB) identifying forwarding information for a plurality of routes, with said forwarding information typically including an identification of an egress interface of the router from which to forward a corresponding packet and next hop information. In one embodiment, a copy of the global FIB is installed in one or more line cards of the router.

Next, in process block 306, the global FIB is filtered to generate a complete local FIB identifying forwarding information (which may include labels) for packets received by the router, such that the complete local FIB includes a copy of less than all of the entries in the global FIB corresponding to a plurality of routes less than all routes of the plurality of routes. This filtering is typically performed by each of the line cards for generating their respective complete local FIB, but may be performed by a single line card, route processing subsystem, or other processing/filtering mechanism. This filtering is possibly responsive to marked routes, a configured predetermined role of the line card, network topology, configuration received via a user interface, etc. For example, one embodiment installs in the complete local FIB: all routes from a particular routing protocol (e.g., IGP, OSPF, IS-IS); only labels that will be used for a line card (e.g., based on network topology); a single default route filtered from more than a hundred entries; on the order of ten thousand routes filtered from more than one hundred thousand routes; different entries in different line cards (e.g., based on the network topology); entries based on administrative tags, prefix ranges, masklengths of entries in the global FIB, or the role of a line card, etc. For example, if the role of the line card is uplink then a small number of routes (e.g., a single default route and/or all routes from a certain routing protocol) may be sufficient. In contrast, a line card in a customer facing role typically will require more routes (e.g., about the hosts of the customer(s)).

Next, in process block 308, a line card determines how to forward packets based on the complete local FIB, with these packets being accordingly forward by the router in process block 310. Processing of the flow diagram of FIG. 3 is complete as illustrated by process block 312. Additionally, the routing information of a network is dynamic, and therefore, the flow diagram, or process blocks thereof, are repeated to update the complete local FIB. For example, in response to a change of conditions of the router in one embodiment, the flow diagram of FIG. 3 may be entered at process block 300, 302, 304 or 306 to update the complete local FIB.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, performed by a router, with said method comprising:
   communicating, by the router via one or more routing protocols, with other routers to generate a routing information base (RIB) for identifying topology information of, including routes within, a network attached to the router;
   generating, from the RIB, a global forwarding information base (FIB) containing entries, wherein the entries include: forwarding information for a plurality of routes, with said forwarding information including an identification of an egress interface of the router and next hop information;
   filtering the global FIB to generate a complete local FIB identifying forwarding information for a plurality of packets received by the router, wherein the complete local FIB includes a copy of less than all of the entries in the global FIB, and wherein the complete local FIB does not include all routes in the plurality of routes;
   determining how to forward each of the plurality of packets based on the complete local FIB; and
   forwarding each of the plurality of packets based on the complete local FIB.

2. The method of claim 1, wherein the router comprises: a line card;
   wherein the line card includes: a plurality of interfaces configured to send and receive packets; the global FIB; and a forwarding engine for performing said operation of determining how to forward each of the plurality of packets based on the complete local FIB; and
   wherein the forwarding engine includes the complete local FIB.

3. The method of claim 2, wherein the line card comprises an application-specific integrated circuit which includes the forwarding engine, which said includes the complete local FIB.

4. The method of claim 1, wherein the router comprises: a route processing subsystem and a line card;
   wherein said operations of communicating with other routers and generating the global FIB are performed by the route processing subsystem;

wherein the method includes storing a copy of the global FIB onto the line card;

wherein the line card includes: the global FIB said copied to it and a forwarding engine for performing said operation of determining how to forward each of the plurality of packets based on the complete local FIB stored on the line card;

wherein the forwarding engine includes the complete local FIB; and wherein said operation of filtering of the global FIB to generate the complete local FIB is performed on the line card.

5. The method of claim 4, wherein the line card includes an application-specific integrated circuit which includes the forwarding engine, which said includes the complete local FIB.

6. The method of claim 1, wherein said operation of filtering is responsive to a configured predetermined role of the line card of the router.

7. The method of claim 1, wherein said one or more routing protocols include an interior gateway protocol (IGP).

8. The method of claim 7, wherein the global FIB includes marking information for identifying what portion of said forwarding information in the global FIB should and what should not be installed in the complete local FIB by said operation of filtering the global FIB; and wherein said marking information identifies that all forwarding information corresponding to routing information received from at least one specific routing protocol of said one or more routing protocols should be installed in the complete local FIB by said operation of filtering the global FIB.

9. The method of claim 1, wherein the global FIB includes marking information for identifying what portion of said forwarding information in the global FIB should and what should not be installed in the complete local FIB by said operation of filtering the global FIB.

10. The method of claim 9, comprising: marking routes in the RIB; wherein said operation of generating the global FIB causes said marking information to be included in the complete local FIB.

11. The method of claim 1, wherein the global FIB includes forwarding information including labels for a plurality of label-switched routes of the plurality of routes; and wherein said operation of filtering the global FIB filters out one or more of the plurality of label-switched routes that will not be used in forwarding packets by the line card based on said topology information.

12. The method of claim 1, wherein said operation of filtering the global FIB filters out one or more of the plurality of routes that will not be used in forwarding packets by the line card based on said topology information.

13. The method of claim 1, wherein said operation of filtering the global FIB in generating the complete local FIB in determining whether or not to include an entry in the local FIB is responsive to configuration settings received via a user interface.

14. The method of claim 1, wherein said operation of filtering the global FIB in generating the complete local FIB in determining whether or not to include an entry in the local FIB is responsive to administrative tags, prefix ranges, or masklengths of entries in the global FIB.

15. The method of claim 1, wherein the global FIB includes over a hundred different forwarding information entries; and wherein said operation of filtering the global FIB results in only forwarding information for a single default route being stored in the complete local FIB.

16. The method of claim 1, wherein the global FIB includes over one hundred thousand different forwarding information entries; and wherein said operation of filtering the global FIB results in less than ten thousand different forwarding entries being stored in the complete local FIB.

17. A router, comprising:

a route processing subsystem configured to communicate, via one or more routing protocols, with other routers to generate a routing information base (RIB) for identifying topology information of, including routes within, a network attached to the router; and configured to generate, from the RIB, a global forwarding information base (FIB) containing entries, wherein the entries include: forwarding information for a plurality of routes, with said forwarding information including an identification of an egress interface of the router and next hop information;

a plurality of line cards communicatively coupled to the route processing subsystem, with each of the plurality of line cards including:

a plurality of interfaces for communicating packets with other communications devices;

storage configured to store a global forwarding information base (FIB) including forwarding information for how to forward corresponding packets from the router, with said forwarding information including an identification of next hop information and an egress interface of the router from which to forward a corresponding packet;

a forwarding engine configured to store a complete local FIB, and configured to determine how to forward packets based on the complete local FIB; and one or more processors configured to filter the global FIB stored locally on the line card to generate the complete local FIB identifying forwarding information for packets, wherein the complete local FIB includes a copy of less than all of the entries in the global FIB.

18. The router of claim 17, wherein each of the plurality of line cards comprises an application-specific integrated circuit which includes the forwarding engine, which said includes the complete local FIB.

19. The router of claim 17, wherein the global FIB includes marking information for identifying what portion of said forwarding information in the global FIB should and what should not be installed in the complete local FIB by said one or more processors configured to filter the global FIB stored locally on the line card to generate the complete local FIB.

20. A router, comprising:

a plurality of line cards, with each of the plurality of line cards including:

a plurality of interfaces configured to send and receive packets;

storage configured to store a global forwarding information base (FIB) containing entries, wherein the entries include: forwarding information including an identification of next hop information and an egress interface of the router;

a forwarding engine configured to store a complete local FIB, and configured to determine how to forward packets based on the complete local FIB; and one or more processing elements configured to filter the global FIB stored locally on the line card to generate the complete local FIB identifying forwarding information for packets, wherein the complete local FIB includes a copy of less than all of the entries in the global FIB; and one or more communications mechanism configured to communicate packets or information among the plurality of line cards.

21. The router of claim 20, wherein for each particular line card of the plurality of line cards said one or more processing elements configured to filter the global FIB are responsive to a configured predetermined role of the particular line card.

22. The router of claim 21, wherein a first line card of the plurality of line cards and a second line card of the plurality of line cards are each configured to have different predetermined roles, and wherein said one or more processing elements configured to filter the global FIB of the first and second line cards are configured to generate different complete local FIBs based on said different predetermined roles.

* * * * *